US012722165B2

(12) United States Patent

Erickson

(10) Patent No.: US 12,722,165 B2
(45) Date of Patent: Sep. 1, 2026

(54) SPRAY HEAD

(71) Applicant: Kohler Co., Kohler, WI (US)

(72) Inventor: Perry Erickson, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/463,086

(22) Filed: Sep. 7, 2023

(65) Prior Publication Data

US 2024/0075484 A1 Mar. 7, 2024

Related U.S. Application Data

(60) Continuation of application No. 16/297,159, filed on Mar. 8, 2019, now Pat. No. 11,786,919, which is a division of application No. 15/489,502, filed on Apr. 17, 2017, now Pat. No. 10,265,711, which is a continuation of application No. 13/359,089, filed on Jan. 26, 2012, now Pat. No. 9,623,423.

(51) Int. Cl.

| | |
|---|---|
| ***B05B 1/18*** | (2006.01) |
| ***B05B 1/14*** | (2006.01) |
| ***B05B 1/16*** | (2006.01) |
| *B05B 7/08* | (2006.01) |
| *B05B 15/65* | (2018.01) |

(52) U.S. Cl.

CPC ................ *B05B 1/185* (2013.01); *B05B 1/14* (2013.01); *B05B 1/16* (2013.01); *B05B 7/0892* (2013.01); *B05B 15/65* (2018.02)

(58) Field of Classification Search

CPC ....... B05B 7/0892; B05B 7/0884; B05B 1/14; B05B 1/16; B05B 1/185; B05B 1/1627; B05B 1/1681; B05B 15/65; E03C 2001/0415; E03C 1/084

USPC .... 239/518, 521, 543–545, 548, 553.5, 558, 239/567, 589, 592

See application file for complete search history.

(56) References Cited

U.S. PATENT DOCUMENTS 603,613 A * 5/1898 Steward .................. B05B 11/06 239/121
5,297,739 A * 3/1994 Allen .................... B08B 15/007 239/548
5,553,783 A * 9/1996 Slavas .................. B05B 1/3405 239/432
8,016,215 B1 * 9/2011 Zhadanov ............ B05B 15/652 239/536
8,695,898 B2 * 4/2014 DeVries .................... E03C 1/08 239/445
8,727,241 B2 * 5/2014 Bosio .................... B05B 12/002 239/525

* cited by examiner

*Primary Examiner* — Jason J Boeckmann
(74) *Attorney, Agent, or Firm* — Husch Blackwell LLP

(57) ABSTRACT

A spray head assembly comprising a body configured to receive a supply of fluid and a face in fluid communication with the body, the face having a plurality of nozzles arranged in a non-linear pattern for directing the fluid from the spray head, wherein the plurality of nozzles are configured to direct the fluid flow to form a wedge-shaped spray pattern between the face and a focal region at a focal length from the spray head, and wherein the spray pattern forms a linear spray arrangement in the focal region.

19 Claims, 15 Drawing Sheets

SPRAY HEAD

CROSS-REFERENCE TO RELATED APPLICATIONS

The present application is a continuation of application Ser. No. 16/297,159, filed Mar. 8, 2019, which is a divisional of application Ser. No. 15/489,502, filed Apr. 17, 2017, now U.S. Pat. No. 10,265,711, which is a continuation of application Ser. No. 13/359,089, filed Jan. 26, 2012, now U.S. Pat. No. 9,623,423. The entire disclosures of each of the foregoing applications are hereby incorporated by reference in their entireties.

BACKGROUND

The present application relates generally to the field of spray head assemblies for use in faucets for directing the spray of fluid (e.g., water) exiting the spray head assemblies. More specifically, the application relates to spray head assemblies configured to discharge a spray of fluid to form a defined shaped spray pattern having a defined shaped spray arrangement at a focal length.

SUMMARY

One embodiment relates to a spray head assembly for a faucet that includes a body configured to receive a supply of fluid and a face in fluid communication with the body, the face having a plurality of nozzles arranged in a non-linear pattern for directing the fluid from the spray head, wherein the plurality of nozzles are configured to direct the fluid flow to form a wedge-shaped spray pattern between the face and a focal region at a focal length from the spray head, and wherein the spray pattern forms a linear spray arrangement in the focal region. The spray pattern may include a plurality of fluid streams with each fluid stream corresponding to one of the plurality of nozzles, wherein each fluid stream is configured not to intersect any other fluid stream between the face and the focal region.

Another embodiment relates to a spray head assembly for a faucet that includes a body configured to receive a supply of fluid and a face in fluid communication with the body, the face having a plurality of nozzles for directing the fluid from the spray head as a plurality of fluid streams, wherein the plurality of nozzles are arranged in a configuration having a first shape and are configured to direct the plurality of fluid streams to form a spray pattern having a second shape in a focal region at a focal length from the face, and wherein the first shape differs from the second shape. The plurality of streams may be configured not to intersect between the face and the focal region.

Yet another embodiment relates to a spray head assembly for a faucet that includes a body configured to receive a supply of fluid, and a face in fluid communication with the body, the face having a plurality of nozzles for directing the fluid from the spray head as a plurality of fluid streams, wherein the plurality of nozzles are arranged in a configuration having a first shape to direct the plurality of fluid streams to form a spray pattern having a second shape in a focal region at a focal length from the face, and wherein the plurality of streams are configured to converge without intersecting between the face and the focal region. The first shape of the plurality of nozzles may differ from the second shape of the spray pattern in the focal region.

DETAILED DESCRIPTION

Figure 1:
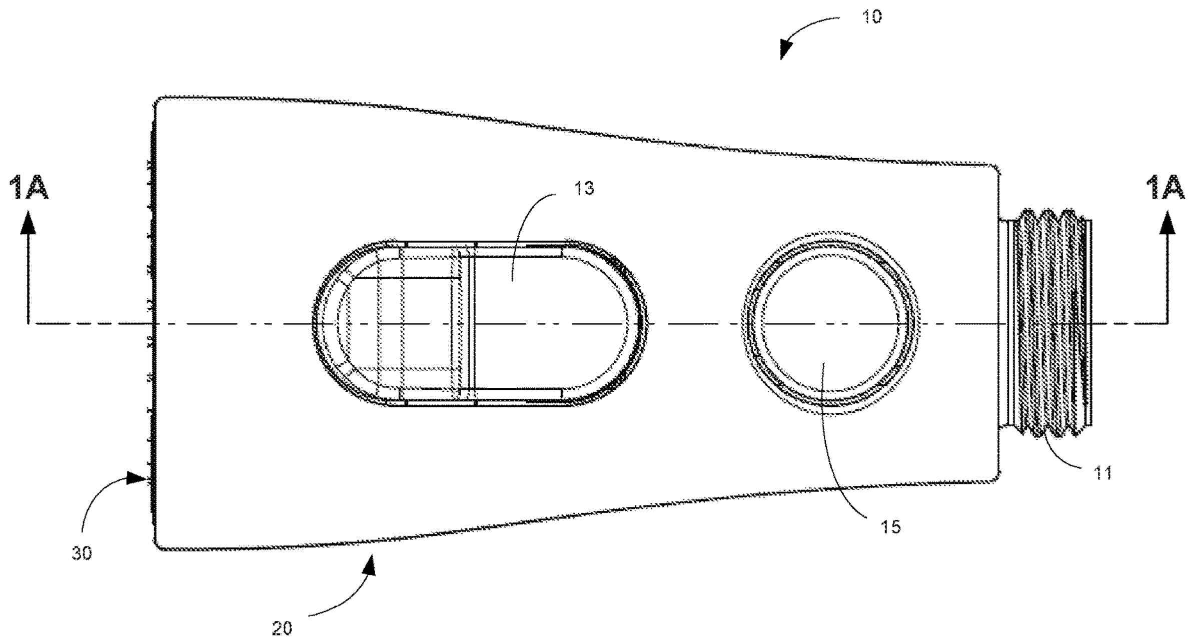
FIG. 1 is a view of a spray head assembly according to an exemplary embodiment.

With general references to the Figures, disclosed herein are spray head assemblies for use in fluid discharging devices, such as faucets, that are configured to direct a fluid flow or a supply of fluid (e.g., water) exiting (e.g., discharged) from a face of the spray head assembly to form a defined shaped spray pattern having a defined (e.g., unique) shaped spray arrangement in a focal region that is configured at a predetermined focal length (e.g., distance) from the face. The face includes a plurality of nozzles that are arranged (e.g., aligned, configured) to generate the desired shape of the spray pattern and spray arrangement. Thus, the plurality of nozzles of the face may be arranged in a configuration having a first shape (e.g., circular, rectangular, etc.), and the arrangement of the spray pattern (i.e., the spray arrangement at the focal region) may be configured having a second shape (e.g., linear, K-shaped, 8-shaped, S-shaped, zigzag-shaped, etc.) that is different than the first shape. In other words, the nozzles of the face may be arranged to change the shape of the spray pattern from where it exits the spray head to the focal region.

For example, the spray head assembly may direct the fluid flow exiting the face to form a wedge shaped spray pattern that forms a substantially linear spray arrangement (e.g., a line) in a focal region located at a focal length from the face. Thus, the wedge shaped spray pattern may converge without intersecting from a non-linear pattern to a linear pattern in a focal region at a focal length from the spray head. The focused linear spray arrangement of the wedge shaped spray pattern may advantageously concentrate the supply (e.g., stream) of water to more effectively clean dishes, kitchen utensils, or other objects that the spray is directed toward. As another example, the spray head assembly may direct the fluid flow exiting the face to form an S-shaped spray arrangement at a focal region located at a focal length from the face of the spray head assembly. For other examples, the spray head assembly may direct the fluid flow exiting the face to form an 8-shaped spray, an elliptical shaped spray, a K-shaped spray, or any other suitable shaped spray arrangement at a focal region located at a focal length from the face of the spray head assembly.

Further, the faces of the spray head assemblies disclosed herein may advantageously provide for interchangeability of the face, such as, to tailor the spray pattern and spray arrangement of the spray head assembly without changing the overall aesthetics of the faucet. Thus, a customer and/or service representative may be able to change the function of the faucet without having to change the faucet or the overall aesthetics of the faucet by replacing the existing face of the spray head with another face having differently configured nozzles to provide a different spray pattern and arrangement. This may be important because often the faucet has aesthetics that are configured to harmoniously match the aesthetics of the other kitchen or bath fixtures.

Figure 1A:
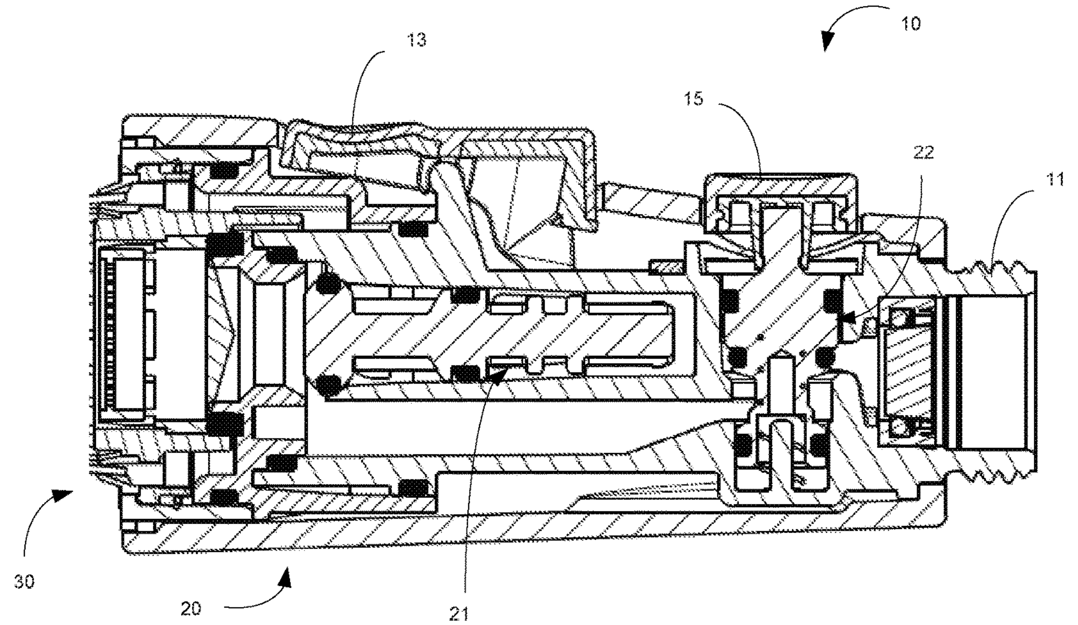
FIG. 1A is a cross-sectional view taken along line 1A-1A of FIG. 1.
Figure 2:
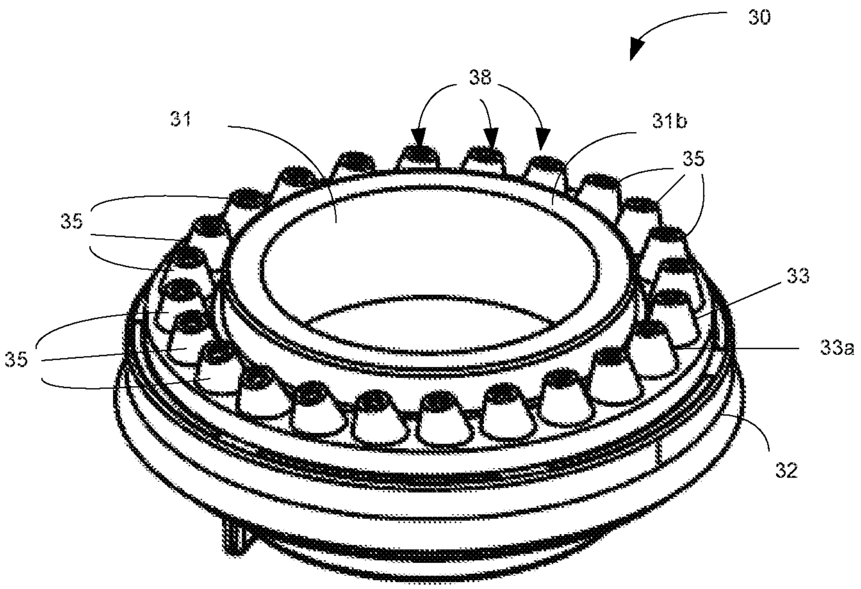
FIG. 2 is a perspective view of an exemplary embodiment of a face for use in a spray head assembly, such as the spray head assembly of FIG. 1.

FIGS. 1 and 1A illustrate an exemplary embodiment of a spray head assembly 10 for use in a faucet (not shown). The spray head assembly 10 includes a threaded inlet opening 11 that is configured to receive a supply of fluid (e.g., water) from the faucet, such as through a tube, and a face 30 (e.g., face member, outer discharge ring, etc.) that is configured to discharge the fluid supply in the form of a spray pattern. For example, the inlet opening 11 of the spray head assembly 10 may be connected to the spout (not shown) of a faucet, whereby the fluid supply passes from the spout into the spray head assembly 10 through a fluid communication member (e.g., valve, tube, conduit, etc.). The spray head assembly 10 may be configured as a pull-out spray head, where the spray head assembly 10 can be selectively removed from and reattached to the spout of the faucet. Alternatively, the spray head assembly 10 may also be configured as a fixed spray head, where the spray head is integrally formed with the spout of the faucet. The spray head assembly 10 may generally be of the type disclosed in U.S. Pat. No. 7,909,269 to Erickson et al., which is herein incorporated by reference in its entirety. It should be noted that the spray head assemblies and faces disclosed herein may be used in any type of faucet and/or fluid discharging device and the examples disclosed herein are not meant as limitations.

The spray head assembly 10 also includes a body 20 (e.g., housing, casing) configured to receive the face 30 coupled thereto. The body 20 also houses the components of the spray head assembly 10. For example, the spray head assembly 10 may include one or more than one valve (e.g., valve body, diverter valve, etc.) for communicating the supply of fluid (e.g., water) from the inlet opening 11 through the body 20 and to the face 30. As shown in FIG. 1A, the spray head assembly 10 includes a first valve 21 (e.g., a diverter valve) and a second valve 22 (e.g., a plunger valve), where the first valve 21 diverts the fluid supply between an aerator cartridge and the face 30 and the second valve 22 operates to allow (or prevent, depending on the position of the second valve 22) the fluid supply to enter the first valve 21. The spray head assembly 10 may also include one or more than one actuator (e.g., button) for selecting between various operating modes of the spray head assembly, such as between a spray pattern discharge mode of operation, such as where the fluid supply exits through the face 30, and a column discharge mode of operation, such as where the fluid supply exits through the aerator cartridge. As shown in FIG. 1A, the spray head assembly 10 includes a first button 13 (e.g., rocker button) and a second button 15 (e.g., pause button), where the first button 13 is configured to activate the first valve 21 to switch modes of operation of the spray head assembly 10 and the second button 15 is configured to activate the second valve 22 to selectively shut off the flow of water to the first valve 21. The spray head assembly 10 may include an aerator cartridge or other suitable device configured to discharge the fluid supply from the spray head assembly 10 in the form of a column of fluid, when the spray head assembly 10 is configured in the column discharge mode of operation. When the spray head assembly 10 is configured in the spray discharge mode of operation, the fluid supply is communicated to the face 30, where the fluid exits the face 30 having a spray pattern, as described herein, having a desired shape. It should be noted that the spray head assembly may be configured differently than the embodiments disclosed herein, and the different embodiments of the spray head assembly may be configured to include a face as disclosed herein.

FIGS. 2-13 illustrate an exemplary embodiment of a face 30 that is configured to be coupled to the body 20 to form the spray head assembly 10, where the face 30 is configured to discharge the fluid supply in the form of a wedge-shaped spray pattern 41. As shown, the face 30 has an annular shape comprising an inner ring 31, an outer ring 32, and a wall 33 connecting the inner ring 31 to the outer ring 32. The inner ring 31 has an inner surface 31*a* that defines an opening that is configured to receive another component of the spray head assembly 10 or body 20, such as an aerator cartridge or a valve body. The inner ring 31 may extend into the body 20 to engage and/or be coupled to other components of the spray head assembly 10. The outer ring 32 is configured to abut and/or connect to the body 20, such as, for example, where the face 30 acts like a cap to the body 20. The spray head assembly 10 may include sealing members (not shown) disposed between the face 30 and the body 20 to prohibit or prevent leaking therebetween. For example, sealing members may be disposed on the ends of the inner ring 31 and/or outer ring 32 to seal the connections between the face 30 and the body 20.

The wall 33 extends between the inner ring 31 and the outer ring 32 to form a channel 34 between the rings 31, 32, where the channel 34 is configured to receive the fluid supply, such as from the body 20 (e.g., a valve body). The wall 33 includes a plurality of nozzles 35 integrally formed with the wall 33 and extending from an exterior surface 33*a* of the wall 33, where each nozzle 35 defines a cavity 36 formed in the wall 33 for receiving the fluid supply when the spray head assembly 10 is configured in the spray discharge mode of operation. Each nozzle 35 has an inlet opening 37 for receiving the fluid supply from the channel 34 and an outlet opening 38 disposed on an end 39 of the nozzle 35 for discharging the fluid supply in the form of a fluid stream 40. Together the plurality of fluid streams 40 form a spray pattern 41 that is configured to have a defined shape, such as those shapes disclosed herein, but not limited thereto. Additionally, the spray pattern 41 may form a defined spray arrangement at a focal length, which may be varied.

According to the exemplary embodiment, the face 30 includes a plurality of nozzles 35 configured in a circular arrangement around the annular wall 33, where the plurality of nozzles 35 are arranged along a substantially common radial length (e.g., each nozzle is configured equidistant from the center of the annular face). Each of the plurality of nozzles 35 is configured to discharge a corresponding fluid stream 40, where the plurality of fluid streams 40 together form the spray pattern 41. Each nozzle 35 has an arrangement (e.g., alignment), such that the plurality of nozzles 35 are configured to define a desired shaped spray pattern 41 from the plurality of fluid streams 40 and/or a defined shaped spray arrangement at a focal length.

As shown in FIGS. 5 and 8-11, the face 30 includes twenty-four nozzles 35*a*-35*x* configured in a circular arrangement around the annular wall 33, where the twenty-four nozzles 35*a*-35*x* are arranged along a substantially common radial length having an arrangement (e.g., alignment) configured to define a desired spray pattern 41. The plurality of nozzles 35*a*-35*x* are configured at unique arrangements in order to discharge corresponding fluid streams 40*a*-40*x* that together form the spray pattern 41 that has a generally wedge-shape from the plurality of outlet openings 38 down to a focal region 43 located at a focal length 44 (e.g., focal distance) from the face 30. In other words, the wedge shaped spray pattern 41 may converge without intersecting from a non-linear pattern when exiting the plurality of nozzles 35*a*-35*x* to a linear pattern in the focal region 43 at the focal length 44 from the spray head assembly 10. The focal length 44 may be measured along a distance substantially perpendicular to a plane formed by the face 30, such as a front surface 31*b* of the face 30 or an exterior surface 33.

Figure 11:
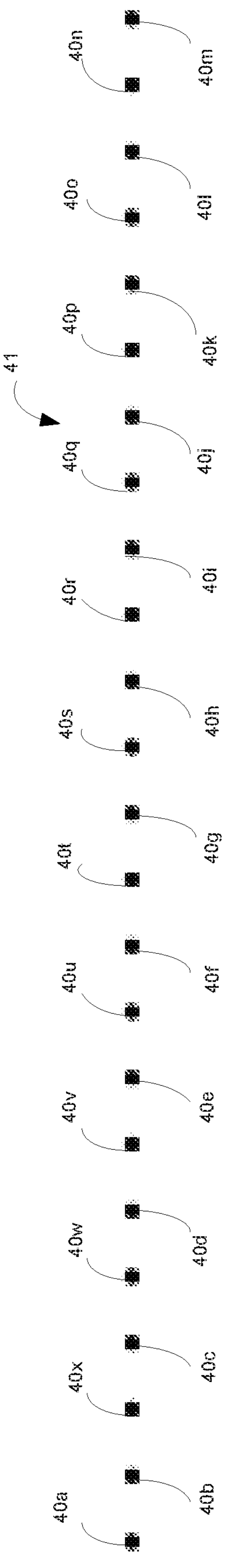
FIG. 11 is a plan view of the spray arrangement of the spray pattern of FIG. 8 at a focal length.

Additionally, the arrangements of the twenty-four nozzles 35*a*-35*x* are configured to deliver the corresponding fluid streams 40*a*-40*x* in a manner that forms a spray pattern 41 having a substantially linear spray arrangement in the focal region 43 at the focal length 44, as shown in FIG. 11, such that each fluid stream of the plurality of fluid streams 40*a*-40*x* does not intersect any other fluid stream of the plurality of fluid streams 40*a*-40*x* along the line of focus. Accordingly, the arrangements of the twenty-four nozzles 35*a*-35*x* are configured to deliver the plurality of fluid streams 40*a*-40*x* at unique non-intersecting vectors, in order to produce the substantially linear shaped non-intersecting spray arrangement of the plurality of fluid streams 40*a*-40*x* in the focal region 43 at the focal length 44.

Figure 9:
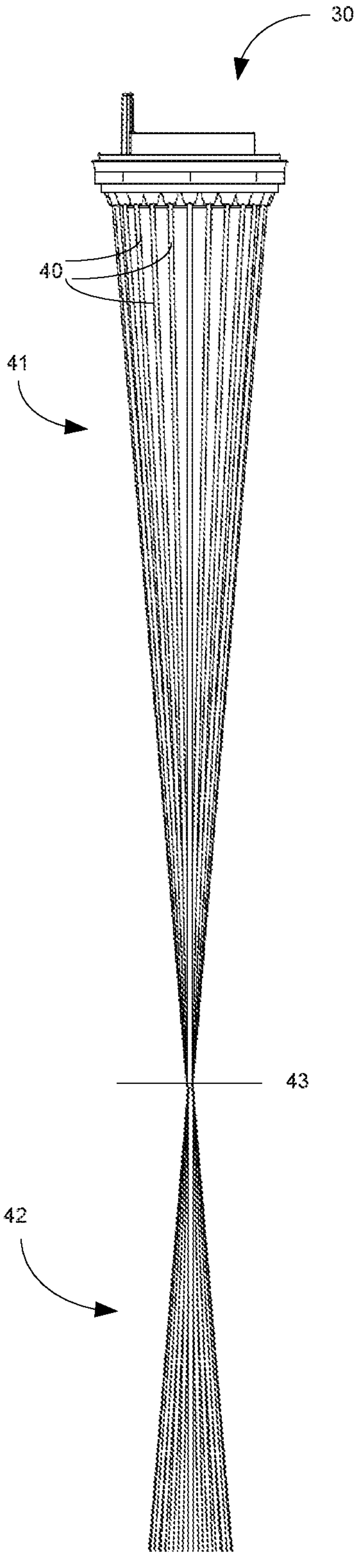
FIG. 9 is a side view of the face and spray pattern of FIG. 8.

As shown in FIG. 9, the plurality of fluid streams 40*a*-40*x* that form the wedge shaped spray pattern 41 also form a second wedge shaped spray pattern 42 beyond the focal region 43, where the second wedge shaped spray pattern 42 is inverted relative to the wedge shape spray pattern 41 formed between the outlet openings 38 of the nozzles 35 and the focal region 43. Thus, the user is able to use the spray head assembly 10 to focus the spray pattern 41 along the linear spray arrangement in the focal region 43 when the item being sprayed is held at (or proximate to) the focal length 44 from the face 30, such as to concentrate the fluid streams to more effectively wash (e.g., clean) the item. Additionally, the user is able to use the spray head assembly 10 to provide a different (e.g., varying) size and shape wedge shaped spray pattern 41, 42 when the item being sprayed is held at a distance that is less than or greater than the focal length 44.

Figure 10:
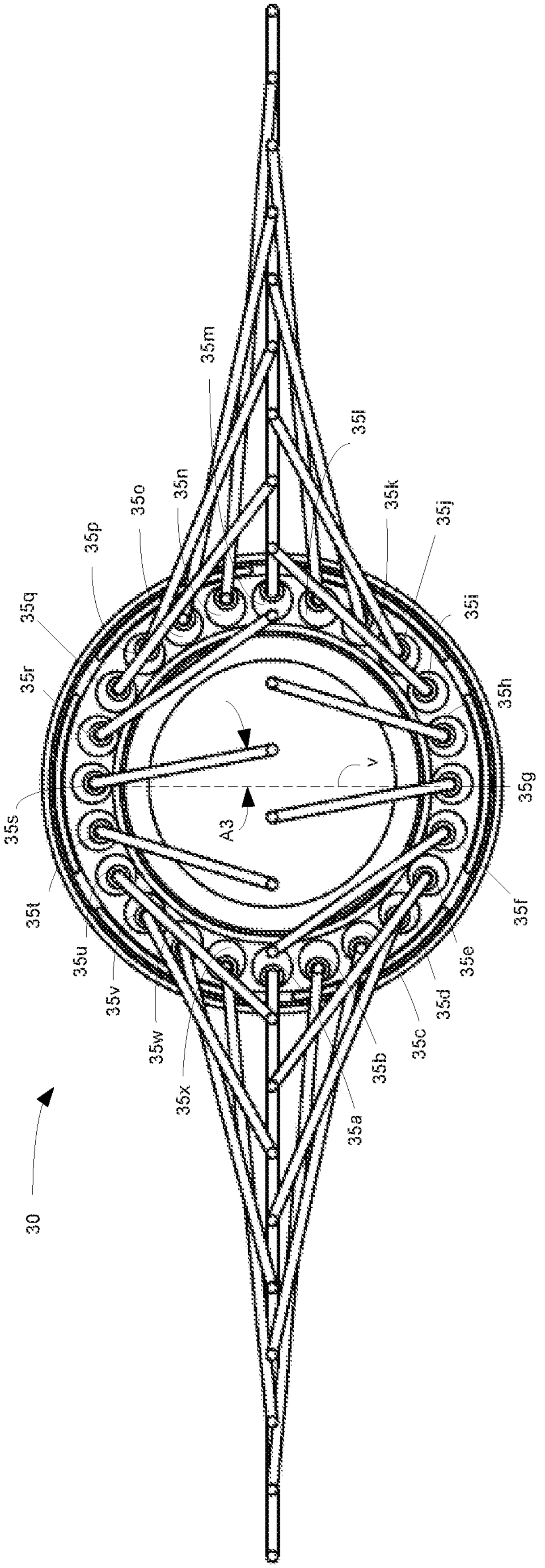
FIG. 10 is a plan view of the face and spray pattern of FIG. 8.
Figure 12:
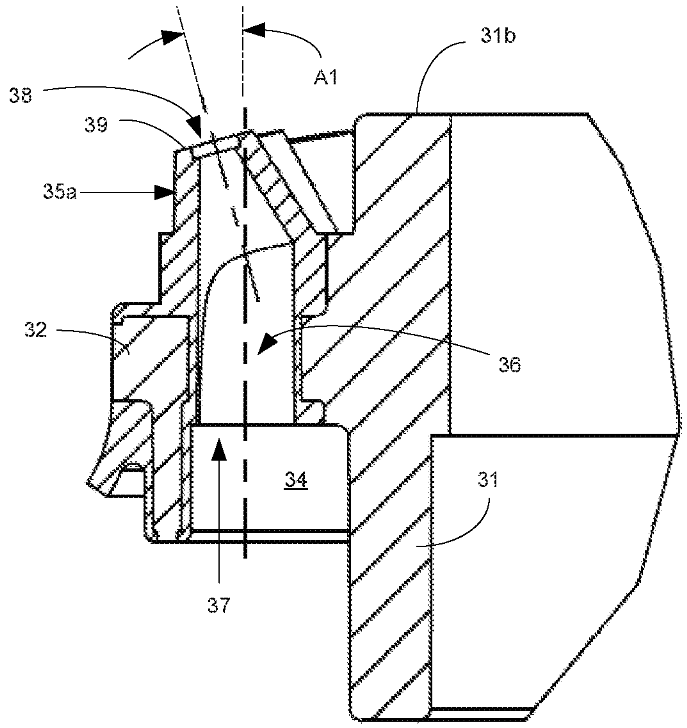
FIG. 12 is a detail view of the face of FIG. 7.
Figure 13:
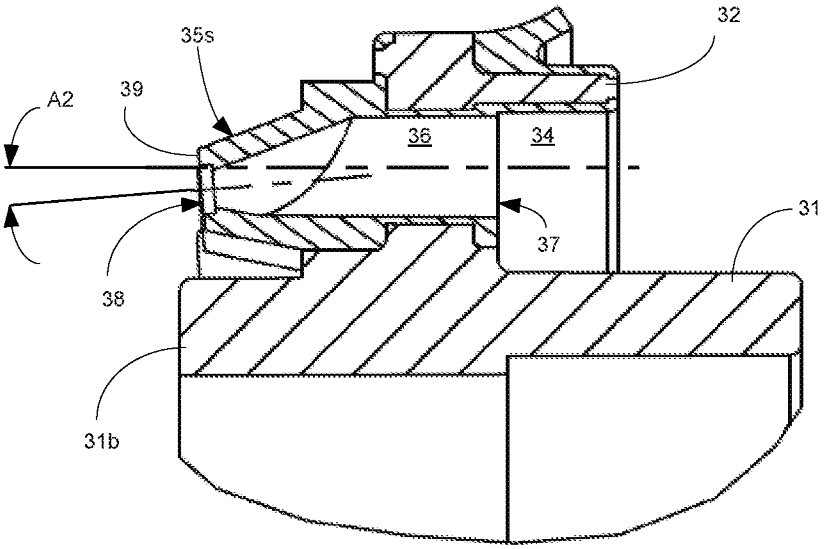
FIG. 13 is a detail view of the face of FIG. 6.
Figure 14:
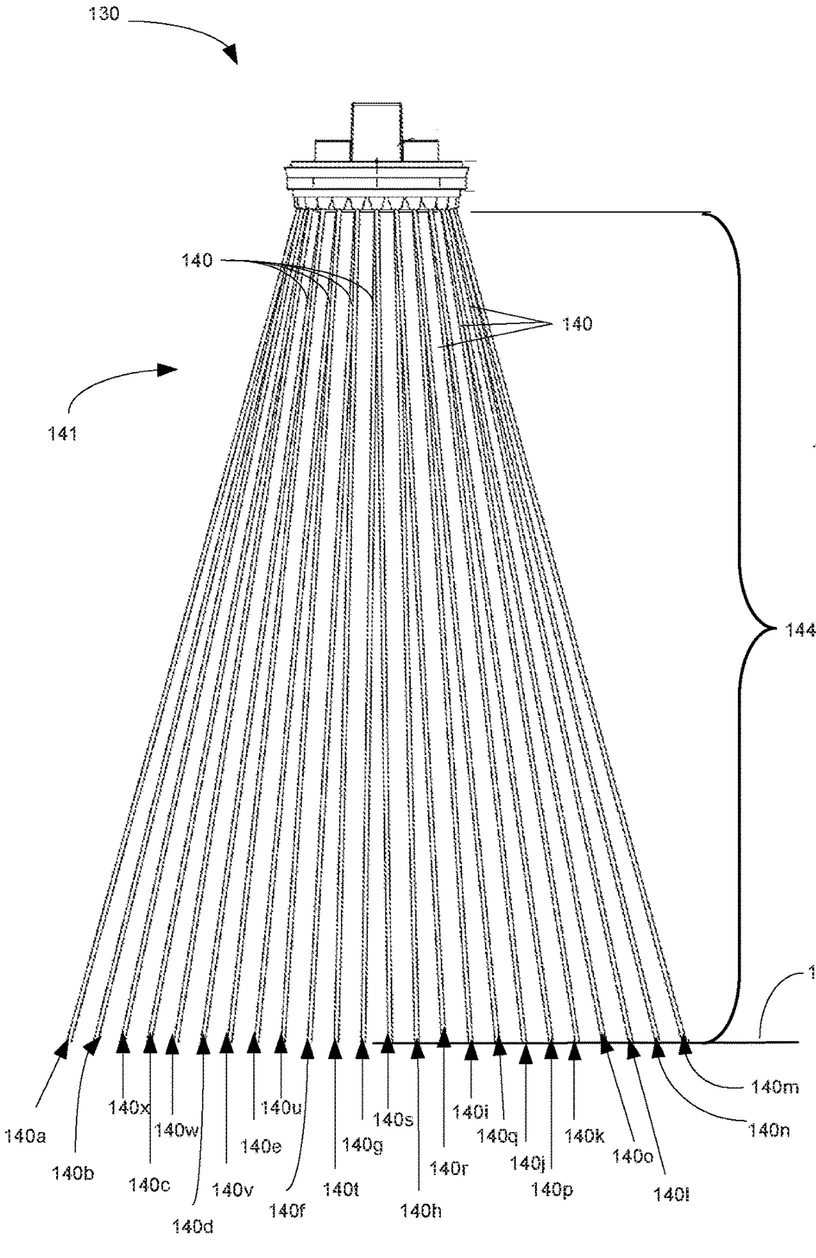
FIG. 14 is a top view illustrating another exemplary embodiment of a face configured to direct a spray pattern that forms an S-shape at a focal length.
Figure 15:
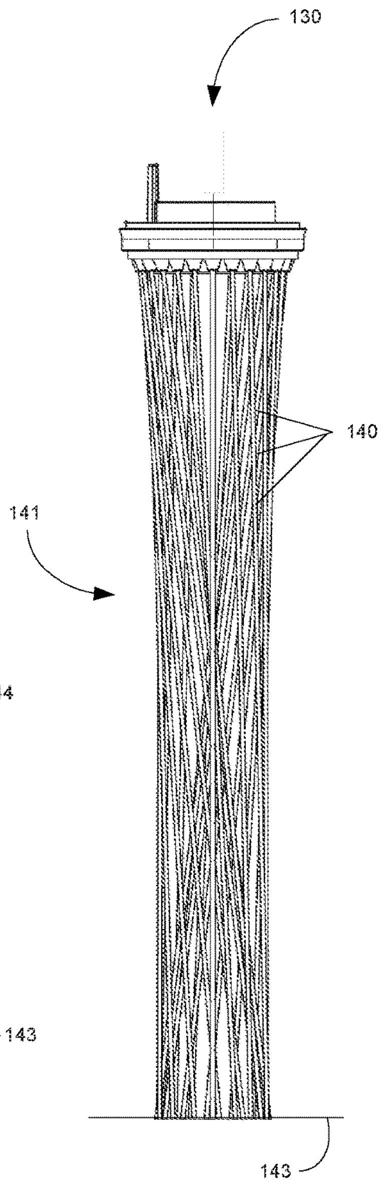
FIG. 15 is a side view of the face and spray pattern of FIG. 14.

As shown in FIGS. 10, 12 and 13, each nozzle 35 is configured to have an arrangement (e.g., alignment), which may differ from the arrangement of the other nozzles, to direct the corresponding fluid stream 40 in a direction away from the face 30 in order to form the linear spray arrangement of the plurality of fluid streams 40*a*-40*x* in the focal region 43. The plurality of nozzles 35*a*-35*x* configured having different arrangements produce a spray pattern 41 having the desired shape (e.g., wedge shaped) where each fluid stream 40 is configured not to intersect (e.g., cross) another fluid stream 40 in the spray pattern 41. By not having intersecting fluid streams 40, the face 30 is able to focus the individual fluid streams 40 to form the desired spray arrangement at the focal length, such as the linear spray arrangement, that is able to more effectively clean the item being sprayed.

Each nozzle 35 may have an angle of inclination, which may differ from the arrangement of the other nozzles, to achieve the desired arrangement (e.g., alignment) relative to the other nozzles to provide the spray arrangement of the face 30 in the focal region 43. The angle of inclination may be relative to a central axis (e.g., longitudinal axis) that is defined by the center of the circular arrangement of the plurality of nozzles 35*a*-35*x* around the face 30. The angle of inclination may take into consideration the different arrangements (e.g., positions, configurations) of the plurality of nozzles 35*a*-35*x* around the face 30, the desired position of the fluid stream 40 within the spray arrangement of the spray pattern 41 (e.g., the position of the stream 40 in the focal region 43 at the focal length 44), as well as the distance of the desired focal length 44. Accordingly, the angle of inclination for each nozzle 35 may include one or more than one angle, such as, for example, having a compound angle that is unique relative to the remaining nozzles 35. For example, for the face 30 configured to discharge the spray pattern 41 having a substantially linear shaped spray arrangement in the focal region 43 at the focal length 44, the angle of inclination includes a compound angle having a first angle that is relative to a first plane that passes through the linear arrangement at the focal length and extends perpendicular from the face (e.g., a horizontally extending plane in FIG. 10) and a second angle that is relative to a second plane that is transverse to the first plane (e.g., a vertically extending plane in FIG. 10).

As shown in FIG. 12, the first nozzle 35*a* has a first angle relative to the first (e.g., horizontal) plane that is about zero degrees (since the first nozzle 35*a* lies along the first plane passing through the linear spray arrangement) and a second angle A1 relative to the second (e.g., vertical) plane. The second angle A1 of nozzle 35*a* is an acute angle extending away from the center of the circular arrangement of the plurality of nozzles 35*a*-35*x*. It should be noted the first and second angles of the first nozzle 35*a* may be varied and configured at any angle (e.g., oblique, acute, obtuse), such as to provide a different shaped spray pattern having a different shaped spray arrangement at the focal length. Additionally, the first and second angles may be varied for each nozzle 35 of the plurality of nozzles 35*a*-35*x*, depending on the position of the respective nozzle 35 along the circular arrangement of the plurality of nozzles 35*a*-35*x*. For example, the nineteenth nozzle 35*s* has a first angle A2 relative to the first (e.g., horizontal) plane passing through the linear spray arrangement, as shown in FIG. 13, and a second angle A3 relative to the second (e.g., vertical) plane V, as shown in FIG. 10. The first angle A2 of the nozzle 35*s* is an acute angle extending toward the center of the circular arrangement of the plurality of nozzles 35*a*-35*x*, and the second angle A3 of the nozzle 35*s* is an acute angle extending away from the center of the circular arrangement of the plurality of nozzles 35*a*-35*x*.

Accordingly, each nozzle 35 of the plurality of nozzles 35*a*-35*x* of the face 30 may have a unique arrangement by having different first and second angles relative to first and second planes to provide a spray pattern 41 that includes a plurality of fluid streams 40*a*-40*x*, such that each fluid stream 40 of the plurality of fluid streams 40*a*-40*x* is configured not to intersect any other fluid stream 40 and to define a substantially linear spray arrangement in the focal region 43 at the focal length 44. It should be noted that the first and second angles (e.g., first and second angles A1, A2, A3) of the various nozzles 35 of the face 30 may be configured at any angle (e.g., obtuse, acute, oblique) and the angle may be varied to tailor the shape of the spray pattern, depending on the spray pattern desired.

According to an exemplary embodiment, the focal region 43 is located at a focal length 44 between about 51 mm (2 in.) and about 254 mm (10 in.) from the face 30. More preferably, the focal region 43 is located at a focal length 44 between about 102 mm (4 in.) and about 203 mm (8 in.) from the face 30. Even more preferably, the focal region 43 is located at a focal length 44 equal to about 152 mm (6 in.) from the face 30. However, it should be noted that the focal length of the focal region may be any distance or length, and the focal length may be varied, such as to cooperate with various examples of faucets and/or spray head assemblies, and the lengths disclosed herein are not meant to be limitations.

Figure 3:
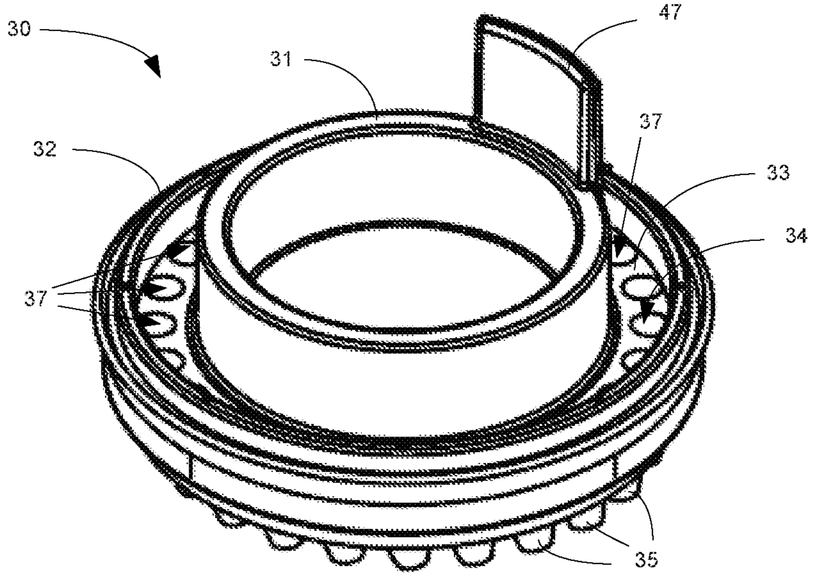
FIG. 3 is another perspective view of the face of FIG. 2.
Figure 5:
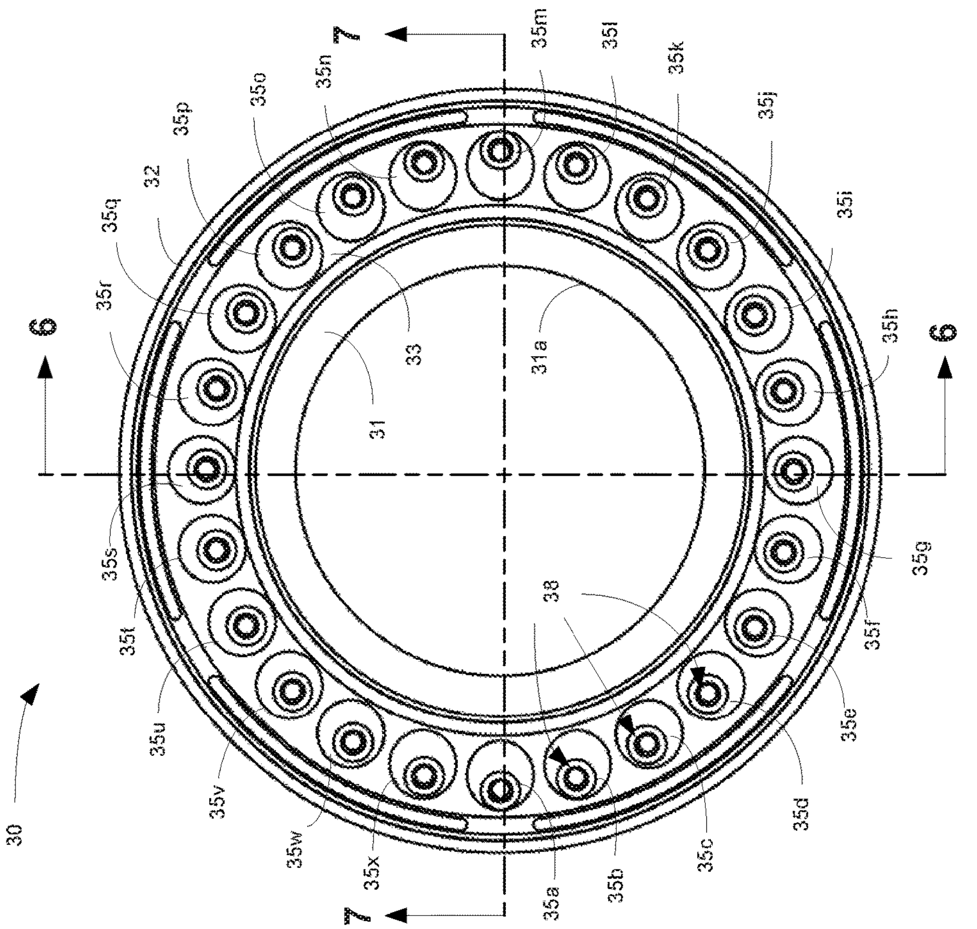
FIG. 5 is a plan view of the face of FIG. 2.
Figure 4:
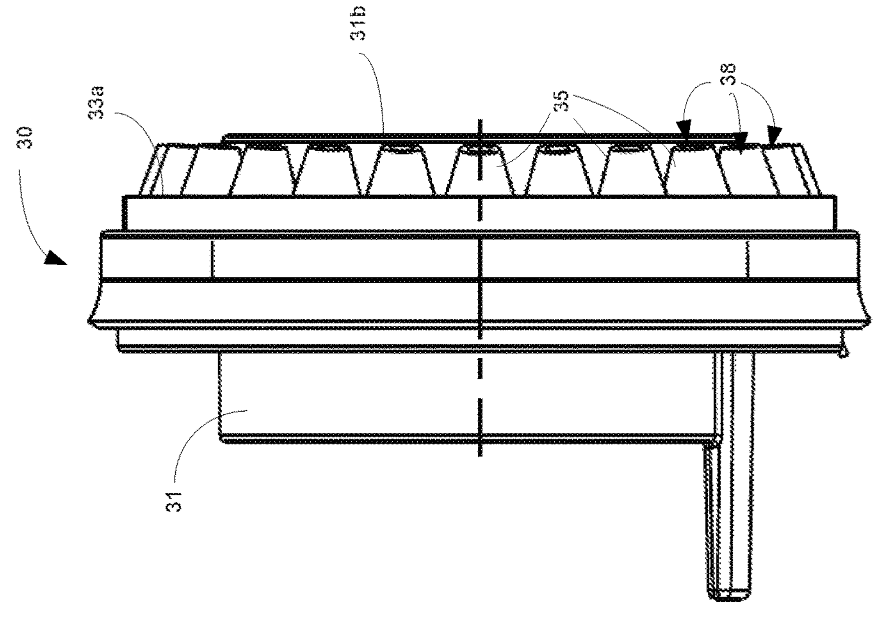
FIG. 4 is a side view of the face of FIG. 2.
Figure 6:
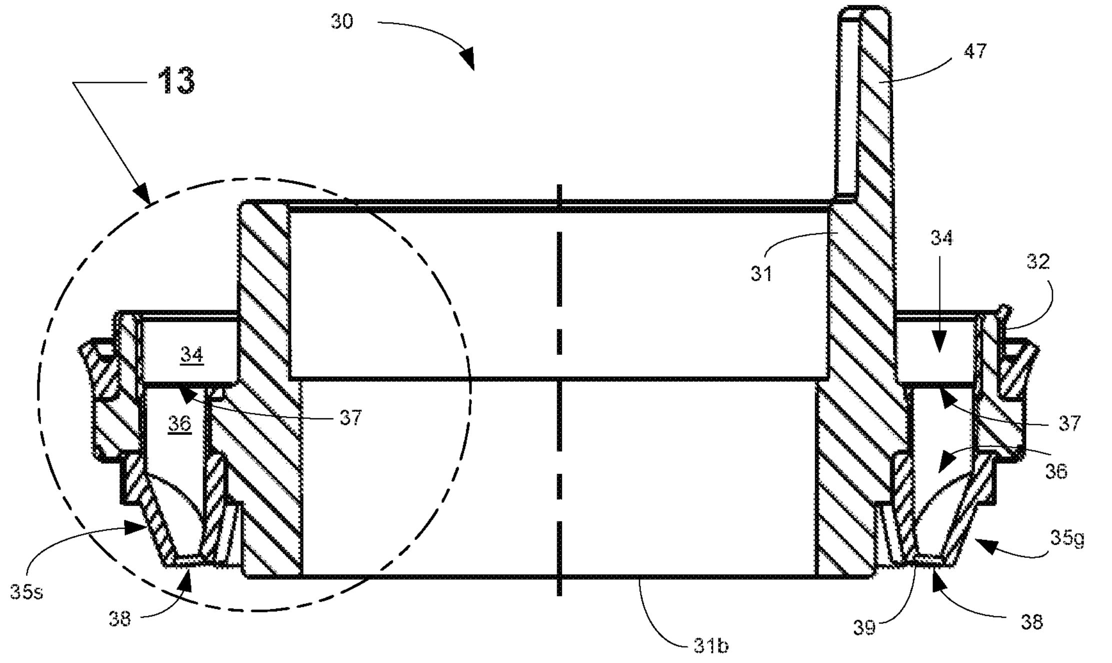
FIG. 6 is a cross-sectional view taken along line 6-6 in FIG. 5.
Figure 7:
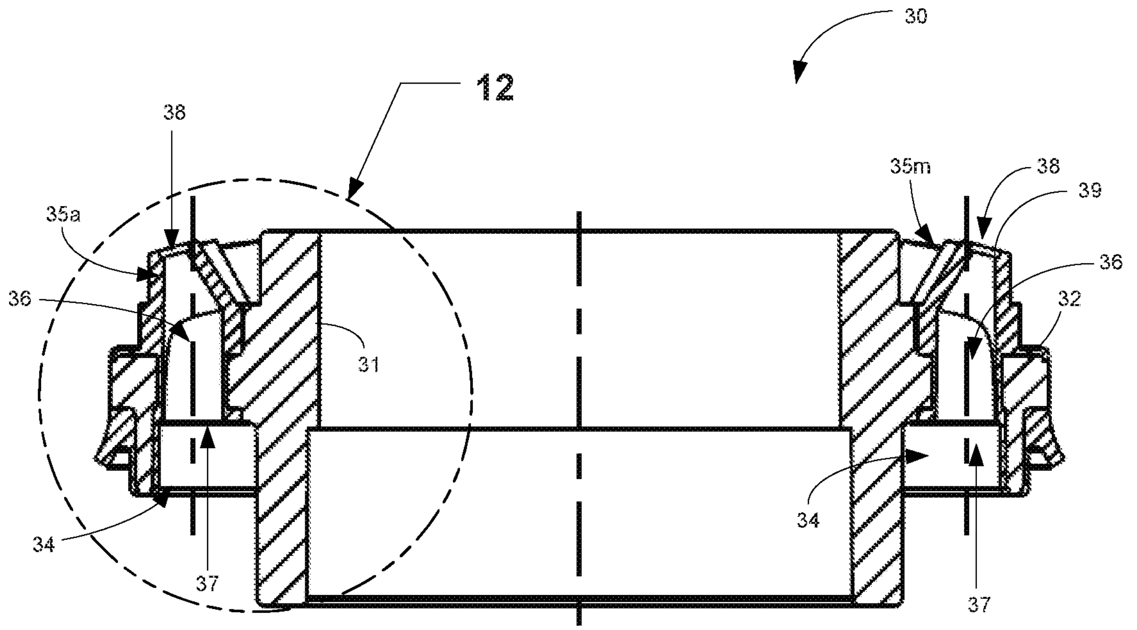
FIG. 7 is a cross-sectional view taken along line 7-7 in FIG. 5.
Figure 8:
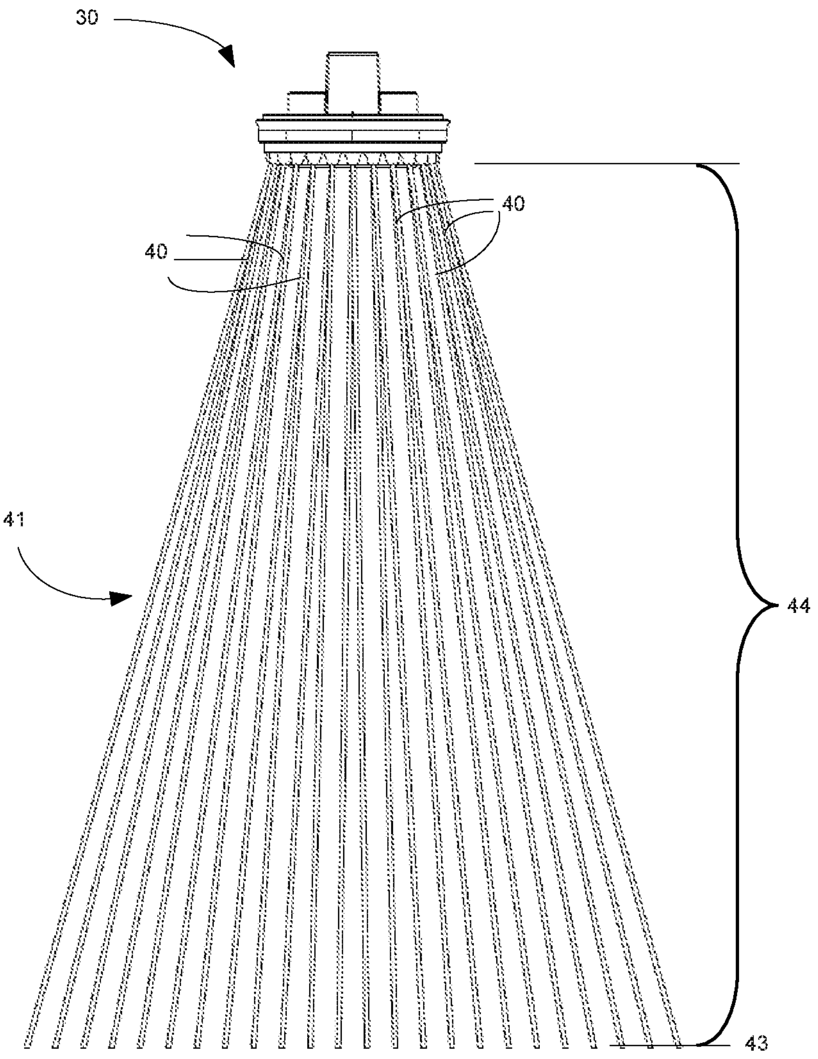
FIG. 8 is a top view illustrating an exemplary embodiment of a face configured to direct a wedge-shaped spray pattern that forms a linear arrangement at a focal length.

The face may include an aligning feature to properly align the face to the spray head assembly, such as to the body. As shown in FIGS. 3, 4, and 6, the face 30 includes a tab 47 that is configured to align the face 30 relative to the spray head assembly 10 (e.g., the body 20), such that the spray pattern 41 is aligned (e.g., has a specific arrangement) with respect to the spray head assembly 10 and/or the faucet (not shown). The alignment tab 47 may be a curved extension protruding from the inner ring 31, where the tab 47 is configured to engage a mating recess or aperture in the body 20 of the spray head assembly 10 to properly align the nozzle 35*a*-35*x* with respect to the body 20. The tab 47 may be integrally formed with the inner ring 31 or formed separately and coupled to the inner ring 31 using any suitable method. However, it should be noted that the face may include any aligning feature (e.g., post, key-way, etc.) having any configuration that is able to align the face relative to the spray head assembly (e.g., the body), and the aligning tab is an example and is not meant as limiting.

Figure 16:
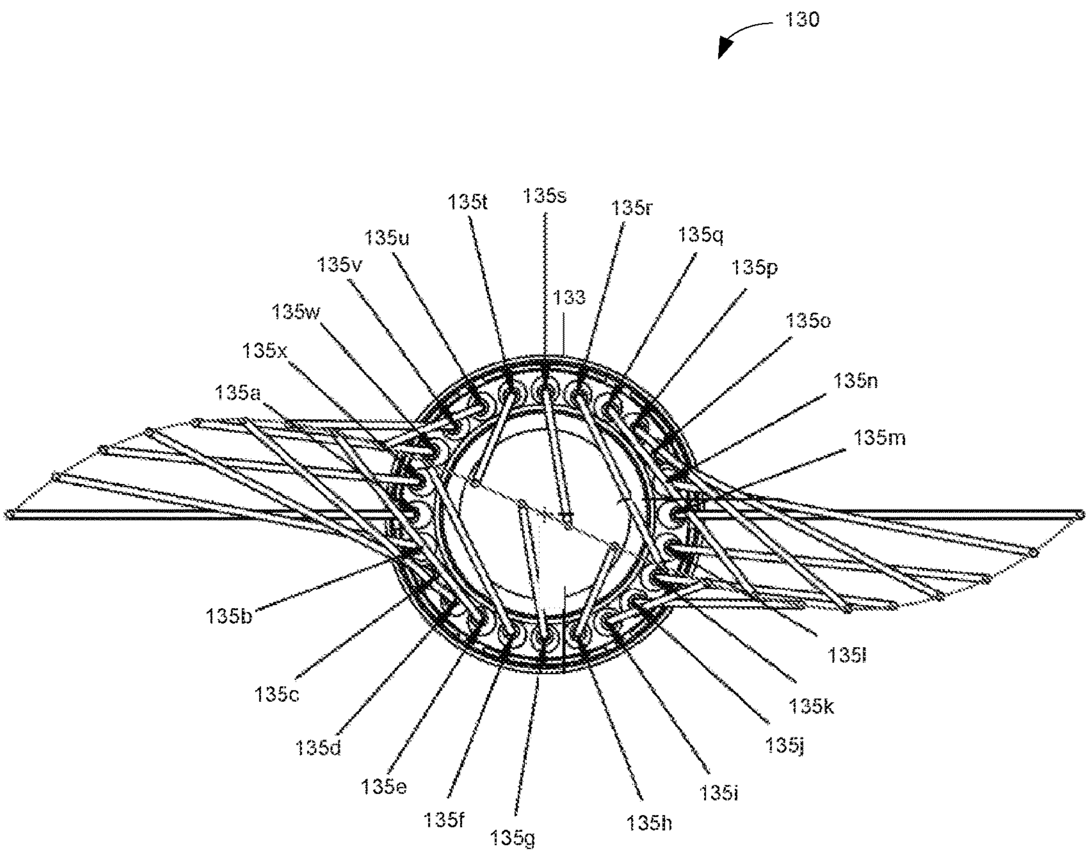
FIG. 16 is a plan view of the face and spray pattern of FIG. 14.
Figure 17:
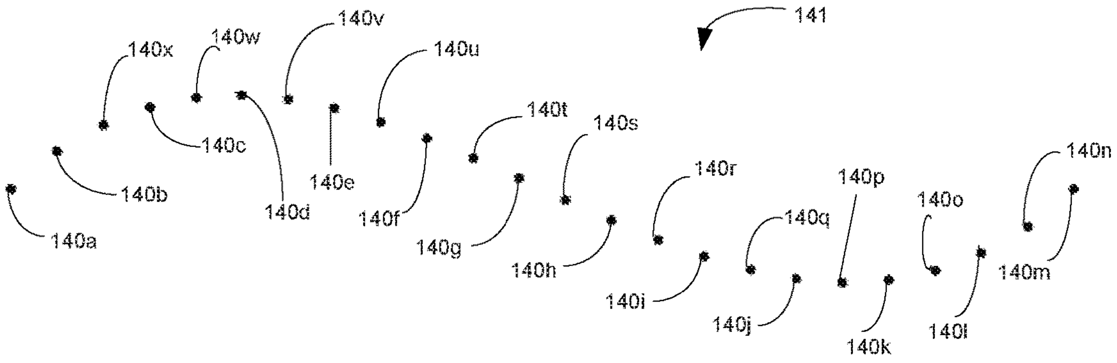
FIG. 17 is a plan view of the spray pattern of FIG. 14 at the focal length.
Figure 18:
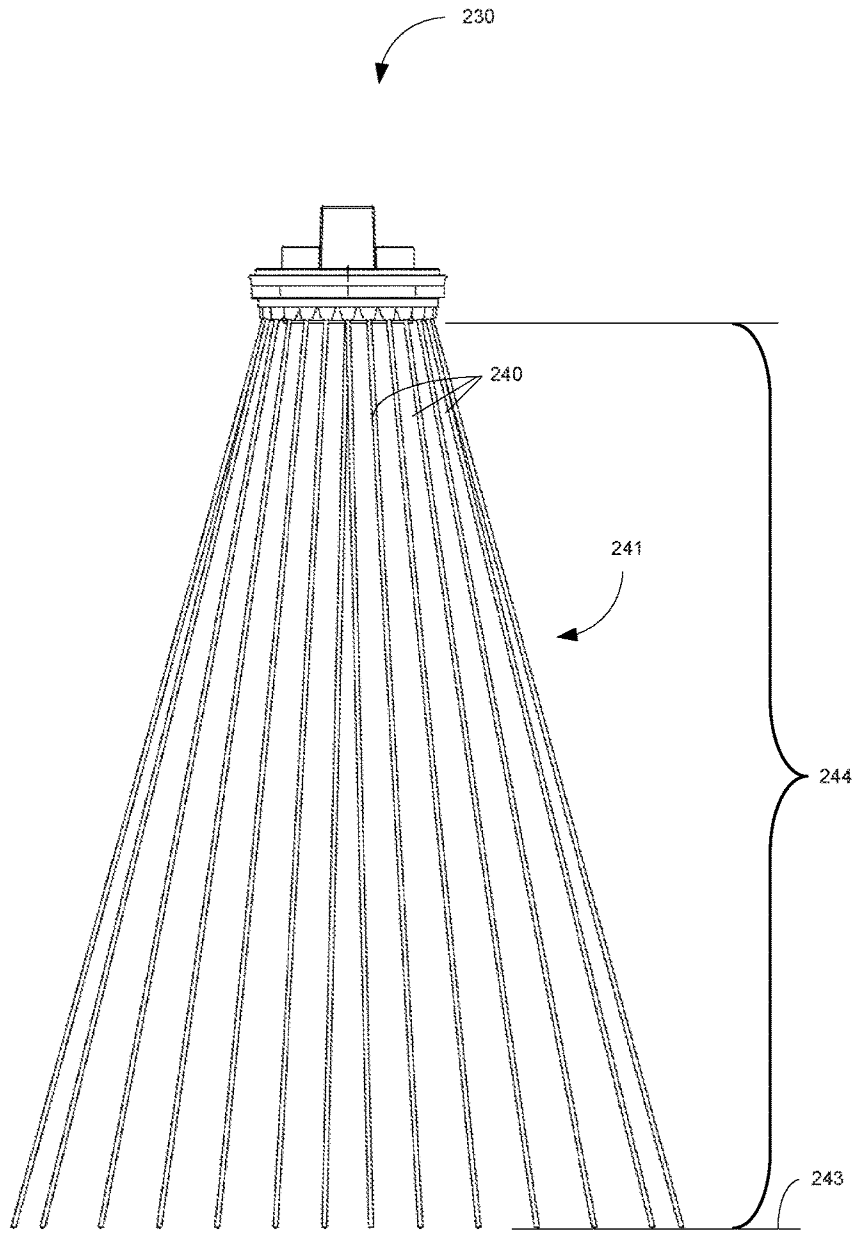
FIG. 18 is a top view illustrating another exemplary embodiment of a face configured to direct a spray pattern that forms an 8-shape at a focal length.
Figure 19:
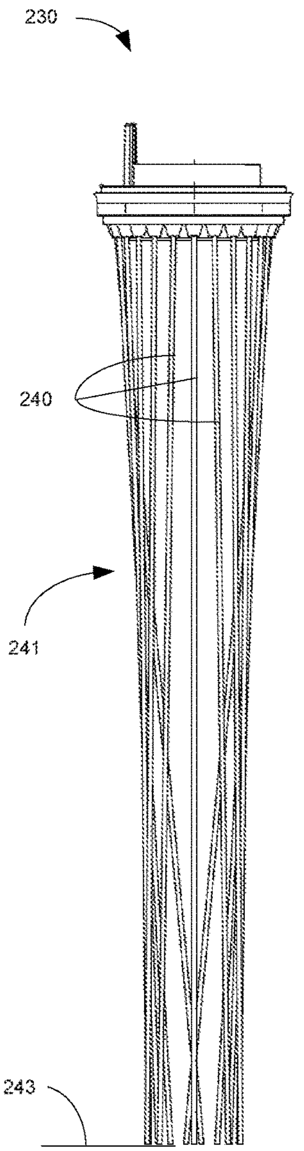
FIG. 19 is a side view of the face and spray pattern of FIG. 18.

FIGS. 14-17 illustrate another exemplary embodiment of a face 130 that is configured to be coupled to a body (e.g., the body 20) of a spray head assembly (e.g., the spray head assembly 10), where the face 130 is configured to discharge the fluid supply in the form of a spray pattern 141. As shown in FIG. 16, the face 130 includes a plurality of nozzles in the form of twenty-four nozzles 135*a*-135*x* configured in a circular arrangement around an annular wall 133 of the face 130, where the twenty-four nozzles 135*a*-135*x* are arranged along a substantially common radial length having an arrangement (e.g., alignment) configured to define a desired spray pattern 141. The plurality of nozzles 135*a*-135*x* are configured having different arrangements in order to discharge a corresponding plurality of fluid streams 140*a*-140*x* that together form the spray pattern 141 and also form an S-shaped spray arrangement (e.g., a "figure S") in a focal region 143 at a focal length 144 from the face 130, as shown in FIG. 17. Each fluid stream 140 of the plurality of fluid streams 140*a*-140*x* may be configured to not intersect any other fluid stream 140 of the plurality of fluid streams 140*a*-140*x* along the focal region 143 at the focal length 144 and/or between the outlet openings of the plurality of nozzles 135*a*-135*x* and the focal region 143 (e.g., along the focal length 144).

Each nozzle 135 of the plurality of nozzles 135*a*-135*x* is configured to have an arrangement (e.g., alignment), which may differ from the arrangement of the other nozzles, to direct the corresponding fluid stream 140*a*-140*x* in a direction away from the face 130 in order to form the desired spray pattern 141 having the S-shaped spray arrangement in the spray region 143 at the focal length 144. Additionally, the arrangements of the plurality of nozzles 135*a*-135*x* may be varied from those shown and described above, whereby the face 130 may still discharge the plurality of fluid streams 140*a*-140*x* in a spray pattern 141 that forms an S-shaped spray arrangement in the focal region 143 at the focal length 144. In other words, the location of each fluid stream 140 of the plurality of fluid streams 140*a*-140*x* in the spray arrangement may be varied along the sequence of the spray arrangement in the focal region 143 relative to the locations shown in FIG. 17.

Figure 20:
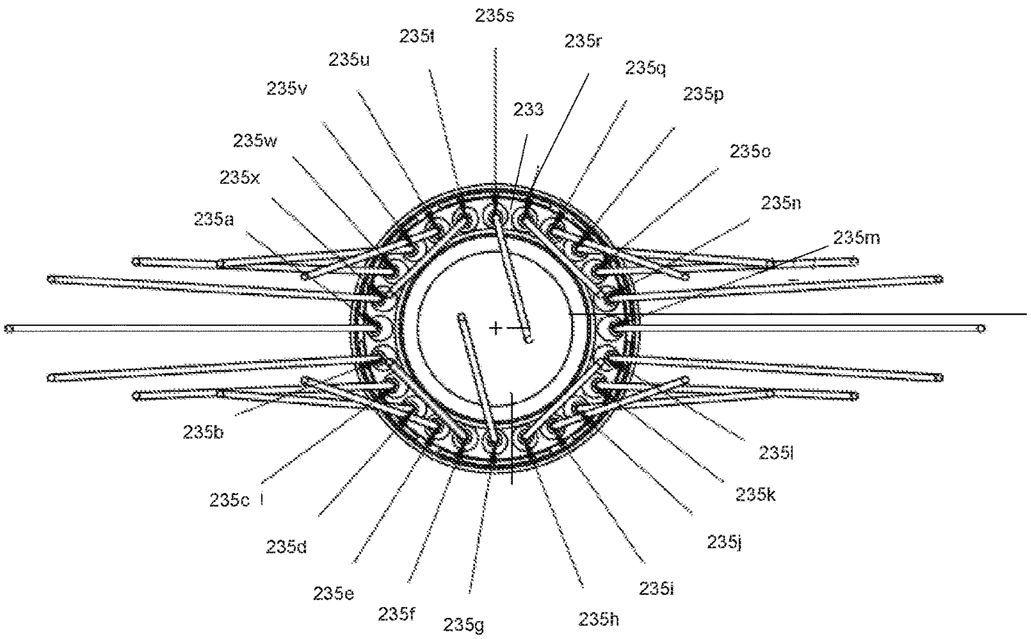
FIG. 20 is a plan view of the face and spray pattern of FIG. 18.
Figure 21:
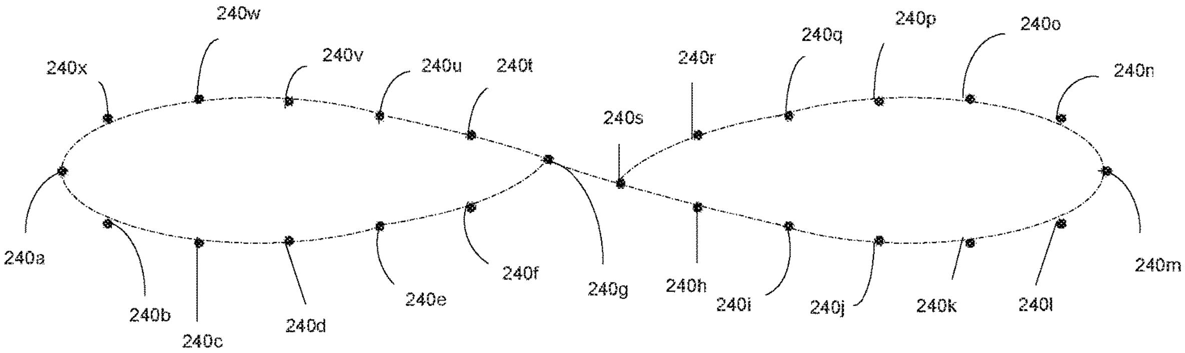
FIG. 21 is a plan view of the spray pattern of FIG. 18 at the focal length.
Figure 22:
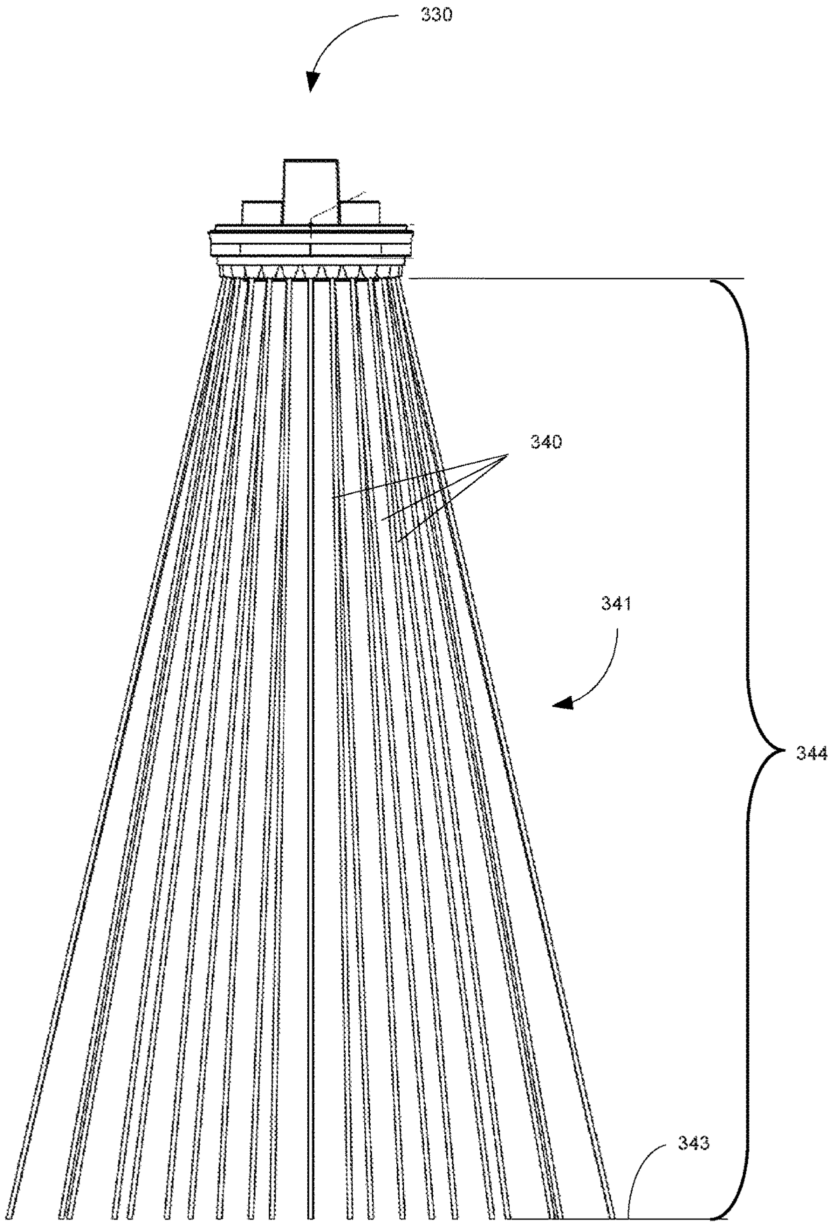
FIG. 22 is a top view illustrating another exemplary embodiment of a face configured to direct a spray pattern that forms a K-shape at a focal length.
Figure 23:
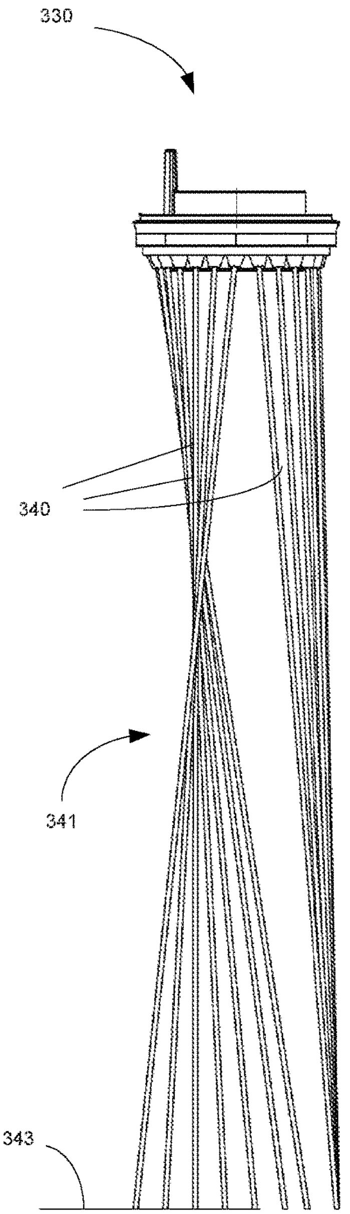
FIG. 23 is a side view of the face and spray pattern of FIG. 22.

FIGS. 18-21 illustrate another exemplary embodiment of a face 230 that is configured to be coupled to a body (e.g., the body 20) of a spray head assembly (e.g., the spray head assembly 10), where the face 230 is configured to discharge the fluid supply in the form of a spray pattern 241. As shown in FIG. 20, the face 230 includes a plurality of nozzles in the form of twenty-four nozzles 235*a*-235*x* configured in a circular arrangement around an annular wall 233 of the face 230, where the twenty-four nozzles 235*a*-235*x* are arranged along a substantially common radial length having an arrangement (e.g., alignment) configured to define a desired spray pattern 241. The plurality of nozzles 235*a*-235*x* are configured having different arrangements in order to discharge a corresponding plurality of fluid streams 240*a*-240*x* that together form the spray pattern 241 and also form an 8-shaped spray arrangement (e.g., a "FIG. 8") in a focal region 243 at a focal length 244 from the face 230. The 8-shaped spray arrangement is shown in FIG. 21 with a dashed line that represents the outline formed by the various fluid streams 240*a*-240*x* to help better illustrate the pattern formed in the focal region 243 by the plurality of fluid streams 240*a*-240*x*. Accordingly, the points along the dashed line identified by the reference numerals 240*a*-240*x* (and not the dashed line itself) are meant to illustrate the specific locations of the plurality of fluid streams 240*a*-240*x*. Each fluid stream 240 of the plurality of fluid streams 240*a*-240*x* may be configured to not intersect any other fluid stream 240 of the plurality of fluid streams 240*a*-240*x* along the focal region 243 at the focal length 244 and/or between the outlet openings of the plurality of nozzles 235*a*-235*x* and the focal region 243 (e.g., along the focal length 244).

Each nozzle 235 of the plurality of nozzles 235*a*-235*x* is configured to have an arrangement (e.g., alignment), which may differ from the arrangement of the other nozzles, to direct the corresponding fluid stream 240*a*-240*x* in a direction away from the face 230 in order to form the desired spray pattern 241 having the 8-shaped spray arrangement in the focal region 243 at the focal length 244. Additionally, the arrangements of the plurality of nozzles 235*a*-235*x* may be varied from those shown and described above, whereby the face 230 may still discharge the plurality of fluid streams 240*a*-240*x* in a spray pattern 241 that forms an 8-shaped spray arrangement in the focal region 243 at the focal length 244. In other words, the location of each fluid stream 240 of the plurality of fluid streams 240*a*-240*x* in the spray arrangement may be varied along the sequence of the spray arrangement in the focal region 243 relative to the locations shown in FIG. 21.

Figure 24:
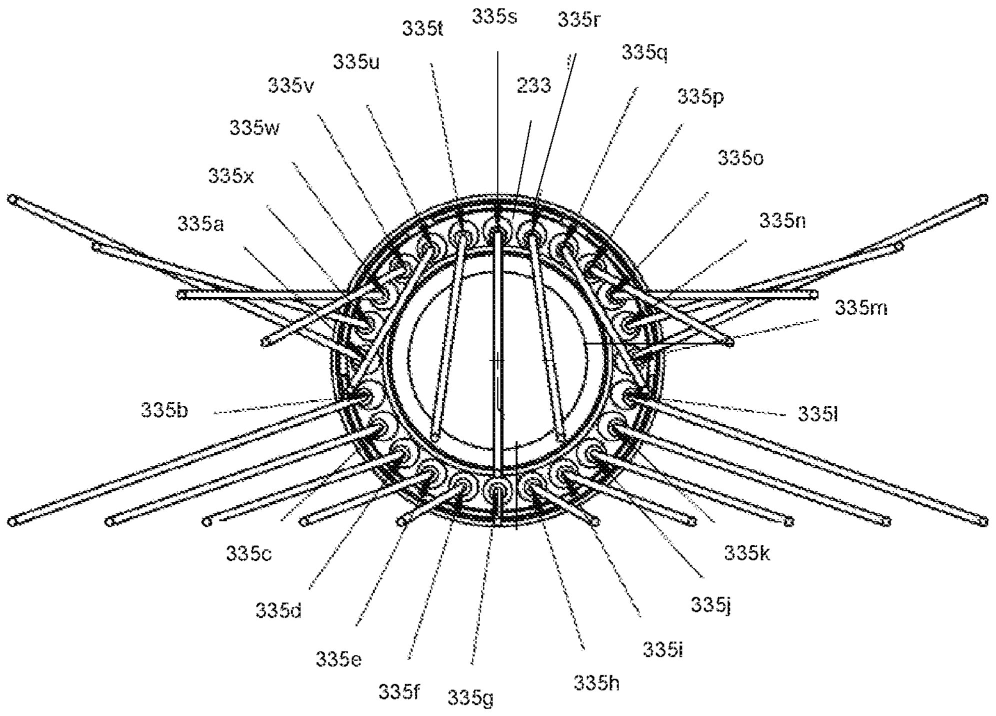
FIG. 24 is a plan view of the face and spray pattern of FIG. 22.
Figure 25:
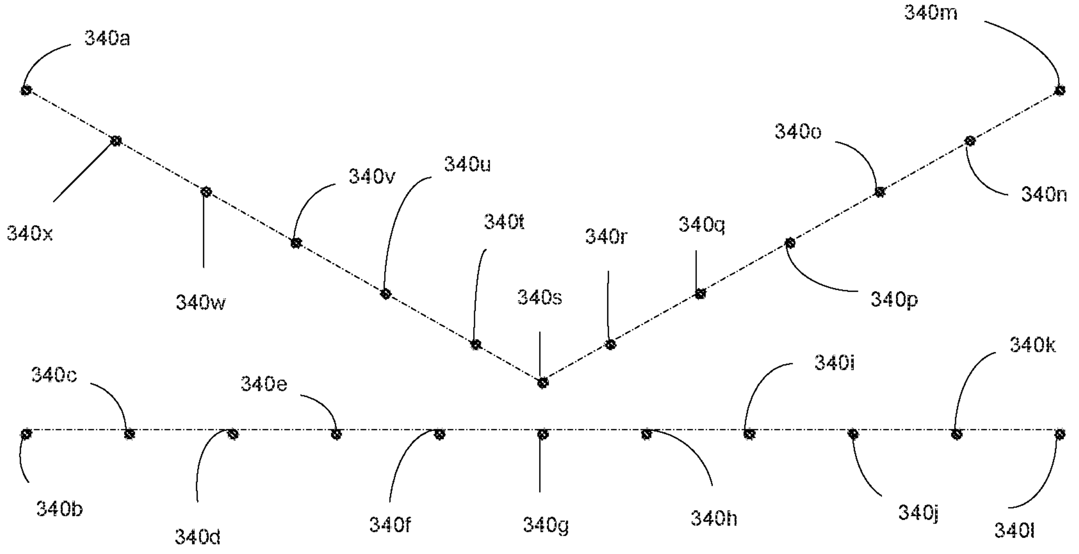
FIG. 25 is a plan view of the spray pattern of FIG. 22 at the focal length.
Figure 26:
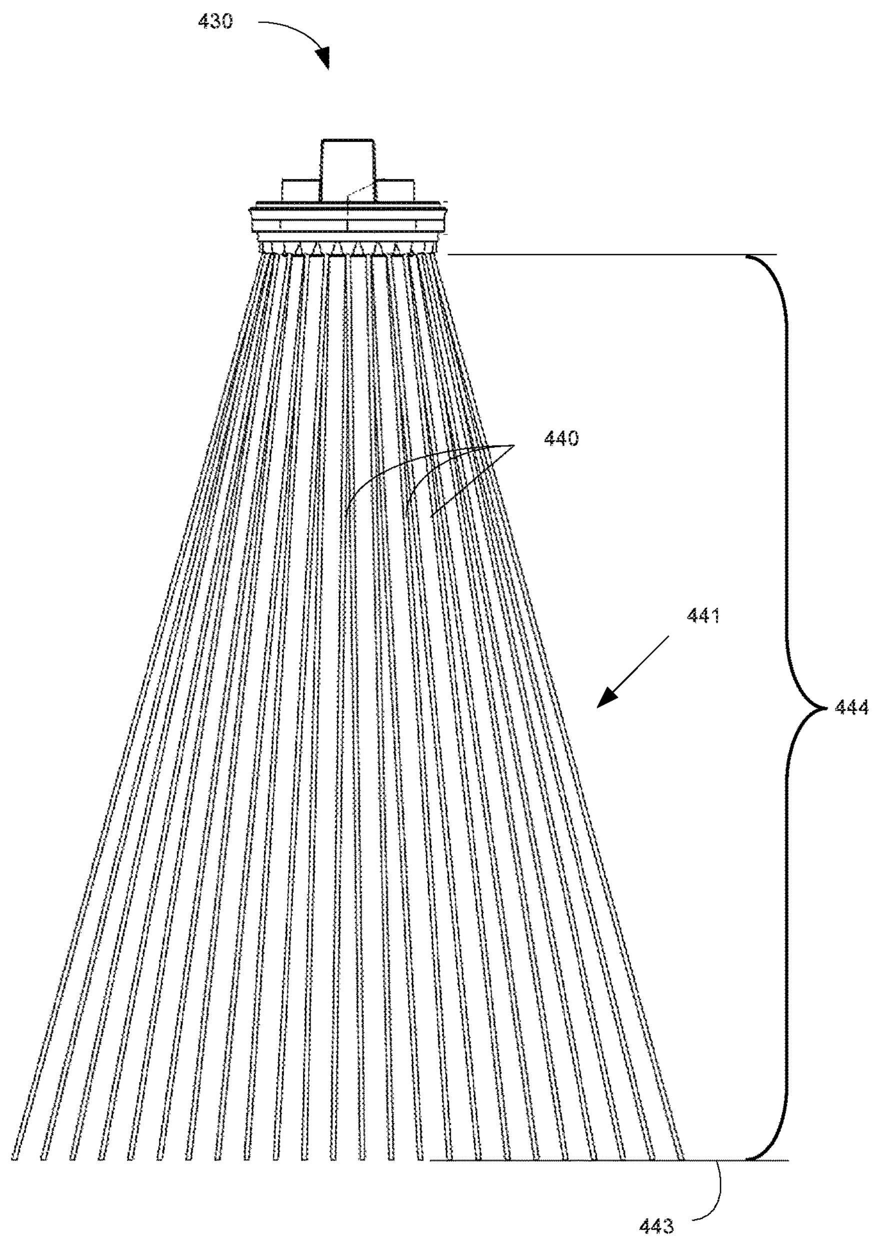
FIG. 26 is a top view illustrating another exemplary embodiment of a face configured to direct a spray pattern that forms a zigzag-shape at a focal length.
Figure 27:
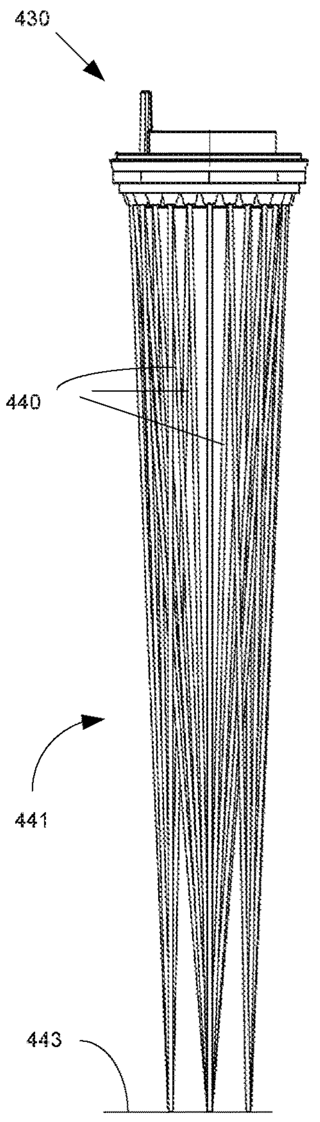
FIG. 27 is a side view of the face and spray pattern of FIG. 26.

FIGS. 22-25 illustrate another exemplary embodiment of a face 330 that is configured to be coupled to a body (e.g., the body 20) of a spray head assembly (e.g., the spray head assembly 10), where the face 330 is configured to discharge the fluid supply in the form of a spray pattern 341. As shown in FIG. 24, the face 330 includes a plurality of nozzles in the form of twenty-four nozzles 335*a*-335*x* configured in a circular arrangement around an annular wall 333 of the face 330, where the twenty-four nozzles 335*a*-335*x* are arranged along a substantially common radial length having an arrangement (e.g., alignment) configured to define a desired spray pattern 341. The plurality of nozzles 335*a*-335*x* are configured having different arrangements in order to discharge a corresponding plurality of fluid streams 340*a*-340*x* that together form the spray pattern 341 and also form an K-shaped spray arrangement in a focal region 343 at a focal length 344 from the face 330. The K-shaped spray arrangement is shown in FIG. 25 with a dashed line that represents the outline formed by the various fluid streams 340*a*-340*x* to help better illustrate the pattern formed in the focal region 343 by the plurality of fluid streams 340*a*-340*x*. Accordingly, the points along the dashed line identified by the reference numerals 340*a*-340*x* (and not the dashed line itself) are meant to illustrate the specific locations of the plurality of fluid streams 340*a*-340*x*. Each fluid stream 340 of the plurality of fluid streams 340*a*-340*x* may be configured to not intersect any other fluid stream 340 of the plurality of fluid streams 340*a*-340*x* along the focal region 343 at the focal length 344 and/or between the outlet openings of the plurality of nozzles 335*a*-335*x* and the focal region 343 (e.g., along the focal length 344).

Each nozzle 335 of the plurality of nozzles 335*a*-335*x* is configured to have an arrangement (e.g., alignment), which may differ from the arrangement of the other nozzles, to direct the corresponding fluid stream 340*a*-340*x* in a direction away from the face 330 in order to form the desired spray pattern 341 having the K-shaped spray arrangement (e.g., a "figure K") in the focal region 343 at the focal length 344. Additionally, the arrangements of the plurality of nozzles 335*a*-335*x* may be varied from those shown and described above, whereby the face 330 may still discharge the plurality of fluid streams 340*a*-340*x* in a spray pattern 341 that forms an K-shaped spray arrangement in the focal region 343 at the focal length 344. In other words, the location of each fluid stream 340 of the plurality of fluid streams 340*a*-340*x* in the spray arrangement may be varied along the sequence of the spray arrangement in the focal region 343 relative to the locations shown in FIG. 25.

Figure 28:
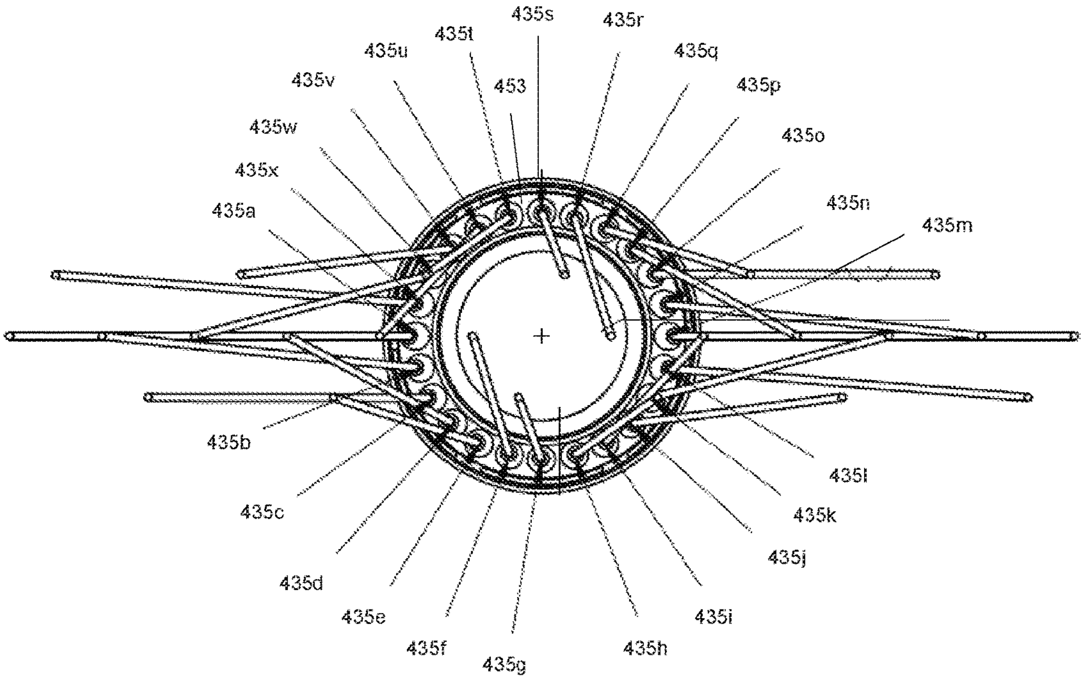
FIG. 28 is a plan view of the face and spray pattern of FIG. 26.
Figure 29:
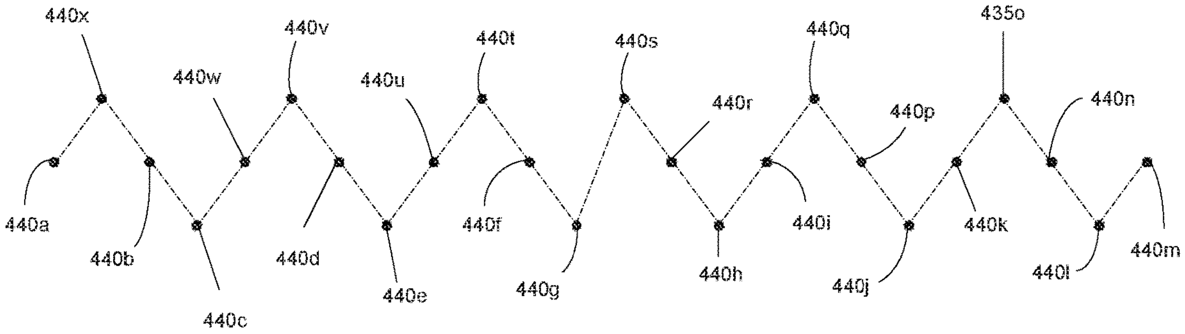
FIG. 29 is a plan view of the spray pattern off FIG. 26 at the focal length.

FIGS. 26-29 illustrate another exemplary embodiment of a face 430 that is configured to be coupled to a body (e.g., the body 20) of a spray head assembly (e.g., the spray head assembly 10), where the face 430 is configured to discharge the fluid supply in the form of a spray pattern 441. As shown in FIG. 28, the face 430 includes a plurality of nozzles in the form of twenty-four nozzles 435*a*-435*x* configured in a circular arrangement around an annular wall 433 of the face 430, where the twenty-four nozzles 435*a*-435*x* are arranged along a substantially common radial length having an arrangement (e.g., alignment) configured to define a desired spray pattern 441. The plurality of nozzles 435*a*-435*x* are configured having different arrangements in order to discharge a corresponding plurality of fluid streams 440*a*-440*x* that together form the spray pattern 441 and also form an zigzag-shaped spray arrangement in a focal region 443 at a focal length 444 from the face 430. The zigzag-shaped spray arrangement is shown in FIG. 29 with a dashed line that represents the outline formed by the various fluid streams 440*a*-440*x* to help better illustrate the pattern formed in the focal region 443 by the plurality of fluid streams 440*a*-440*x*. Accordingly, the points along the dashed line identified by the reference numerals 440*a*-440*x* (and not the dashed line itself) are meant to illustrate the specific locations of the plurality of fluid streams 440*a*-440*x*. Each fluid stream 440 of the plurality of fluid streams 440*a*-440*x* may be configured to not intersect any other fluid stream 440 of the plurality of fluid streams 440*a*-440*x* along the focal region 443 at the focal length 444 and/or between the outlet openings of the plurality of nozzles 435*a*-435*x* and the focal region 443 (e.g., along the focal length 444).

Each nozzle 435 of the plurality of nozzles 435*a*-435*x* is configured to have an arrangement (e.g., alignment), which may differ from the arrangement of the other nozzles, to direct the corresponding fluid stream 440*a*-440*x* in a direction away from the face 430 in order to form the desired spray pattern 441 having the zigzag-shaped spray arrangement in the focal region 443 at the focal length 444. Additionally, the arrangements of the plurality of nozzles 435*a*-435*x* may be varied from those shown and described above, whereby the face 430 may still discharge the plurality of fluid streams 440*a*-440*x* in a spray pattern 441 that forms an zigzag-shaped spray arrangement in the focal region 443 at the focal length 444. In other words, the location of each fluid stream 440 of the plurality of fluid streams 440*a*-440*x* in the spray arrangement may be varied along the sequence of the spray arrangement in the focal region 443 relative to the locations shown in FIG. 29.

It should be noted that the spray head assemblies having faces with nozzles configured to discharge a spray pattern may be varied from the exemplary embodiments disclosed herein, such as to produce a spray pattern and/or a spray arrangement at a focal length that is different from those spray patterns and arrangements disclosed herein. Additionally, the number of nozzles along the face may be varied, such that the face may include fewer or greater than twenty-four nozzles. Further, the arrangement and/or orientation of the nozzles along the face may be varied, such as to provide different spray patterns at the focal length or to have a different configuration of nozzles for different shaped faces. For example, the face may be configured having a shape other than an annular shape, where the nozzles may be arranged having a shape other than a circular arrangement along the face. As an example, the face may have a substantially square shape, where the nozzles may have a substantially square arrangement around the face. The square arrangement of nozzles may provide a spray pattern that forms an S-shaped, K-shaped, linear shaped, or any suitable shaped spray arrangement that differs from the arrangement of the nozzles at a focal region located a focal length from the face of the spray head assembly. Additionally, two or more of the fluid streams of the various spray patterns formed by the various faces may be configured to intersect after exiting the plurality of nozzles of the face.

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” etc.) are merely used to describe the orientation and/or arrangement of various elements in the FIGURES. It should be noted that the orientation of various elements may differ according to other exemplary embodiments, and that such variations are intended to be encompassed by the present disclosure.

It is important to note that the construction and arrangement of the spray head assemblies and face members as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed:

1. A spray head assembly for a faucet, comprising:

a body having an inlet configured to receive a supply of fluid, the body having a longitudinal axis; and a face in fluid communication with the body, the face including an annular shape comprising an inner ring, an outer ring, and a wall connecting the inner ring to the outer ring, the face having at least three nozzles extending from an exterior surface of the wall and arranged in a non-linear pattern for directing a fluid flow in a first wedge-shaped spray pattern between the face and a focal region at a focal length from the spray head assembly, wherein each of the nozzles has an alignment different from an alignment of the other nozzles, wherein the first wedge-shaped spray pattern forms a linear spray arrangement in the focal region, and wherein the at least three nozzles is configured to form a second wedge-shaped spray pattern beyond the focal region.

2. The spray head assembly of claim 1, wherein the second wedge-shaped spray pattern is inverted relative to the first wedge-shaped spray pattern.

3. The spray head assembly of claim 2, wherein the at least three nozzles forms a spray arrangement at a length from the spray head assembly greater than the focal length.

4. The spray head assembly of claim 1, wherein the at least three nozzles is fixed relative to the face in the non-linear pattern about the longitudinal axis of the body.

5. The spray head assembly of claim 1, wherein each fluid stream from each nozzle of the at least three nozzles do not intersect another fluid stream along the focal length.

6. The spray head assembly of claim 1, further comprising an actuator operatively coupled to the body for selectively controlling a flow of the fluid to the at least three nozzles, such that the fluid is directed to only the at least three nozzles in a first position of the actuator.

7. The spray head assembly of claim 1, further comprising an aerator cartridge configured to discharge the supply of fluid from the spray head assembly in the form of a column of fluid when the spray head assembly is configured in a column discharge mode of operation.

8. A spray head assembly, comprising:

a body configured to receive water, the body terminating in a face, the face including an annular shape comprising an inner ring, an outer ring, and a wall connecting the inner ring to the outer ring;

a first nozzle fixed relative to the face having a first axis and configured to discharge a first stream of water along the first axis; and a plurality of second nozzles extending from an exterior surface of the wall and fixed relative to the face in a circular pattern and configured to discharge the water into a spray pattern having a first wedge-shaped spray arrangement forming a linear shape at a focal distance spaced from the face, the linear shape at the focal distance having an overall length greater than a diameter of the circular pattern of second nozzles, and a second wedge-shaped spray arrangement beyond the focal distance, the second wedge-shaped spray arrangement being inverted relative to the first wedge-shaped spray arrangement, wherein each of the nozzles of the plurality of second nozzles has an alignment different from an alignment of the other nozzles.

9. The spray head assembly of claim 8, wherein the plurality of second nozzles forms a spray arrangement at a length from the spray head assembly greater than the focal distance.

10. The spray head assembly of claim 8, wherein the plurality of second nozzles includes a first nozzle having a first nozzle axis and configured to discharge a first stream along the first nozzle axis to the spray pattern, and a second nozzle having a second nozzle axis and configured to discharge a second stream along the second nozzle axis to the spray pattern, the second nozzle axis not being parallel to the first nozzle axis.

11. The spray head assembly of claim 10, wherein the second nozzle axis does not intersect the first nozzle axis along a focal length from the face to the focal distance.

12. The spray head assembly of claim 10, wherein the first stream does not intersect the second stream along a focal length from the face to the focal distance.

13. The spray head assembly of claim 8, further comprising an actuator operatively coupled to the body for selectively controlling a flow of the water to the plurality of second nozzles, such that the water is directed to only the plurality of second nozzles in a first position of the actuator.

14. The spray head assembly of claim 8, further comprising an aerator cartridge disposed within the inner ring and being configured to discharge water from the spray head assembly in the form of a column of fluid when the spray head assembly is configured in a column discharge mode of operation.

15. A spray head configured to be coupled to a body of a spray head assembly, the spray head comprising:

a face spray having an annular shape comprising an inner ring, an outer ring, and a wall connecting the inner ring to the outer ring; and a plurality of nozzles formed integrally with the wall and extending from an exterior surface of the wall and fixed relative to the face spray in a non-linear arrangement about a longitudinal axis extending through the face spray, the plurality of nozzles being configured to discharge fluid in a wedge-shaped spray pattern to form a linear spray arrangement at a focal distance spaced from the plurality of nozzles, wherein each of the nozzles has an alignment different from an alignment of the other nozzles, wherein the plurality of nozzles includes a first nozzle oriented to discharge fluid in a direction toward the longitudinal axis, and a second nozzle oriented to discharge fluid in a direction away from the longitudinal axis.

16. The spray head of claim 15, wherein the nozzles of the plurality of nozzles are arranged in a circular shape.

17. The spray head of claim 15, wherein the first nozzle includes a first axis and is configured to discharge fluid along the first axis to the spray pattern, and a second nozzle includes a second axis and configured to discharge fluid along the second axis to the spray pattern, the second axis not intersecting the first axis and not being parallel to the first axis.

18. The spray head of claim 15, wherein the spray pattern converges from the face spray to the focal distance in a first dimension, and wherein the spray pattern diverges from the face to the focal distance in a second dimension, the second dimension orthogonal to the first dimension.

19. The spray head of claim 15, further comprising a tab protruding upwardly from the inner ring, the tab being configured to engage the body of the spray head assembly to align the face spray relative to the body.

* * * * *